United States Patent [19]

Kilmartin, III

[11] Patent Number: 4,948,204
[45] Date of Patent: Aug. 14, 1990

[54] DISPLAY CABINET CONSTRUCTION

[75] Inventor: John D. Kilmartin, III, Providence, R.I.

[73] Assignee: International Packaging Corporation, Pawtucket, R.I.

[21] Appl. No.: 410,086

[22] Filed: Sep. 21, 1989

[51] Int. Cl.⁵ .............................................. A47F 3/00
[52] U.S. Cl. .................................... 312/140; 403/382; 403/403
[58] Field of Search .............. 403/382, 403, 402, 205; 312/138.1, 140, 257.1

[56] References Cited

U.S. PATENT DOCUMENTS

| | | | |
|---|---|---|---|
| 296,444 | 4/1884 | Perkins | 312/140 X |
| 1,818,404 | 8/1931 | Kaufman | 312/140 |
| 2,969,268 | 1/1961 | Mason, et al. | 312/140 X |
| 4,621,879 | 11/1986 | Schneider | 312/140 X |
| 4,702,638 | 10/1987 | Zalesak | 312/140 X |
| 4,731,973 | 3/1988 | Stenemann | 312/140 X |
| 4,768,845 | 9/1988 | Yeh | 312/257.1 |

Primary Examiner—Joseph Falk
Attorney, Agent, or Firm—Salter & Michaelson

[57] ABSTRACT

A display cabinet includes spaced top and bottom walls, a pair of spaced side walls and four corner elements which are received on the top and bottoms walls and the side walls for securing them in an assembled position wherein they cooperate to define a substantially rectangular structure. The display cabinet also includes an inner cross wall which extends between the side walls and the top and bottom walls for supporting items for display and front and rear walls which are hingeably attached to the side walls so as to function as doors.

9 Claims, 2 Drawing Sheets

DISPLAY CABINET CONSTRUCTION

BACKGROUND AND SUMMARY OF THE INVENTION

The instant invention relates to display apparatus and more particularly to an attractive yet durable display cabinet which is adapted to be economically manufactured and readily and easily assembled from prefabricated components.

While a variety of different types of display cabinets have been heretofore available for displaying items, such as jewelry items, etc., in retail displays, most of the heretofore available display cabinets have not been adapted for relatively inexpensive constructions which are nevertheless both durable and attractive. In this connection, due to the limitations of the previously known construction techniques, many of the relatively durable display cabinets which have been heretofore available have been relatively expensive because they have required labor intensive assembly operations. Nevertheless, it has often been found that relatively rugged and durable display cabinets are often essential for certain applications, such as for displaying relatively expensive jewelry items which must be maintained under lock and key.

The instant invention provides an effective, durable and attractive display cabinet which is adapted for relatively inexpensive constructions and which is also adapted to be readily and easily assembled from prefabricated components. Specifically, the display cabinet of the instant invention comprises spaced, substantially parallel top and bottom walls, spaced, substantially parallel first and second side walls extending in substantially perpendicular relation between the top and bottom walls and a cross wall extending in substantially perpendicular relation between the top and bottom walls and the side walls. The display cabinet further comprises four corner elements joining the top and bottom walls to the side walls and joining the cross wall to the top and bottom walls and the side walls. The corner elements each comprise a longitudinally elongated right angle inner piece, a longitudinally elongated right angle outer piece and spacer means for maintaining the inner and outer pieces in substantially uniformly spaced relation. One of the top or bottom walls and one of the first or second side walls is received in snug engagement between the inner and outer pieces of each of the corner elements for joining the top and bottom walls to the side walls so that they cooperate to define a substantially rectangular structure. Each of the corner elements further comprises positioning means on the inner side of the inner piece thereof for positioning the cross wall in substantially perpendicular relation to the top and bottom walls and the side walls. The cross wall preferably comprises a rear wall and the positioning means preferably comprises hinge means for hingeably attaching the rear wall to one of the side walls and stop means adjacent the rear extremities of the corner elements for positioning the rear wall adjacent to rear extremities of the top and bottom walls and the side walls when the rear wall is in a closed position. The cabinet preferably further comprises an inner cross wall extending in substantially perpendicular relation between the top and bottom walls and the first and second side walls in inwardly spaced relation to the rear wall. The inner piece of each of the corner elements preferably further comprises channel means on the inner side thereof for receiving and positioning the inner cross wall in the interior of the display cabinet. The display cabinet preferably still further comprises a front cross wall and hinge means hingeably connecting the front cross wall to the one of the first or second side walls and stop means on the corner elements for positioning the front cross wall adjacent the front extremities of the top and bottom walls and the side walls when the front wall is in a closed position. The corner elements preferably further comprise reduced outer piece end walls adjacent opposite ends of the inner sides of the outer corner pieces thereof and reduced inner piece end walls adjacent opposite ends of the outer sides of the inner corner pieces thereof. The inner corner piece end walls and the outer corner piece end walls of each corner element are preferably received in interfitting relation for preventing relative longitudinal movement therebetween. The corner elements preferably each comprise retaining means which are snap receivable in interfitting engagement for retaining the inner and outer corner pieces thereof in assembled relation. The retaining means are preferably disposed on the inner and outer corner piece end walls and they are preferably operative for retaining the inner and outer corner pieces in assembled positions wherein they snugly engage the top or bottom walls and the first or second side walls received therein for rigidly maintaining the display cabinet in assembled relation. Further, at least one corner piece of each corner element preferably has a pair of elongated gripping rails formed thereon which are receivable in grooves in the cabinet walls received therein for securing the cabinet walls in position.

It has been found that the display cabinet of the instant invention is both rugged and durable and that it can be effectively utilized for neatly and attractively displaying items, such as jewelry items, for retail sale. It is regard, it has been found that the corner elements are operative for effectively and rigidly securing the top and bottom walls and the side walls together and that when the top and bottom walls, the side walls and the front rear walls are made of a transparent plastic material various items can be neatly displayed by supporting or suspending them from the inner cross wall. It has also been found that the corner elements can be readily and easily assembled with the top and bottom walls, the side walls and the cross walls to enable the display cabinet to be assembled with a minimum of labor costs. Still further, it has been found that because the display cabinet of the subject invention can be economically manufactured in relatively durable and rugged constructions it can be effectively adapted to be locked in order to maintain the security of high priced items displayed therein.

Accordingly, it is an object of the instant invention to provide an effective and attractive display cabinet which is both rugged and durable.

Another object of the instant invention is to provide a durable display cabinet which can be economically manufactured.

Still another object of the instant invention is to provide an effective display cabinet for displaying items, such as, jewelry items in a retail display.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated out the present invention.

DESCRIPTION OF THE INVENTION

Figure 1:
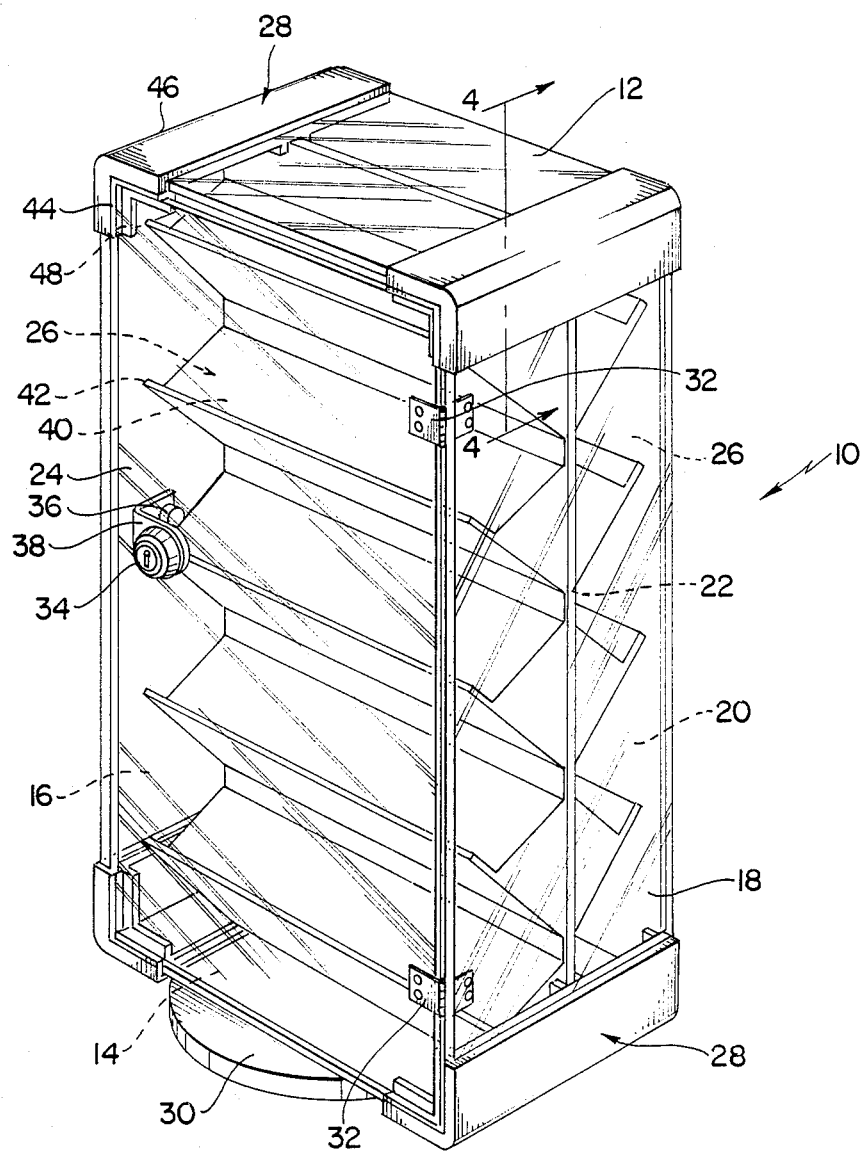
FIG. 1 is a perspective view of the display cabinet of the instant invention.

Referring now to the drawings, the display cabinet of the instant invention is illustrated in FIG. 1 and generally indicated at 10. The display cabinet 10 comprises top and bottom walls 12 and 14, respectively, first and second side walls 16 and 18, respectively, a rear cross wall 20, an inner cross wall 22 and a front cross wall 24. The display cabinet 10 further comprises a pair of shelf elements 26 on the inner cross wall 22, four corner elements generally indicated at 28 and a turntable 30. As illustrated, the top and bottom walls 12 and 14, respectively, and the side walls 16 and 18 are secured in position with the corner elements 28 to form a substantially rectangular structure. The inner cross wall 22 and the shelf elements 26 are also secured in position with the corner elements 28. The front and rear cross walls 24 and 20, respectively, are hingeably connected to the second and first side walls 18 and 16, respectively, so that they are operative for substantially closing the front and rear ends, respectively, of the display cabinet 10. The bottom wall 14 is received and secured on the turntable 30 for rotatable supporting the display cabinet 10 on a supporting surface.

The top and bottom walls 12 and 14, respectively and the first and second side walls 16 and 18, respectively, are preferably constructed from a suitable durable, rigid transparent plastic sheet material in substantially rectangular configurations as illustrated and they are secured in position with the corner elements 28 so that the top and bottom walls 12 and 14, respectively, are substantially parallel and so that the first and second side walls 16 and 18, respectively, are also substantially parallel. In this regard, the top and bottom walls 12 and 14, respectively, and the first and second side walls 16 and 18, respectively, have grooves 19 formed therein adjacent the connected ends thereof (see FIG. 4) for receiving portions of the corner elements 28 in order to retain the walls 12, 14, 16 and 18 in assembled positions in the corner elements 28. The front and rear walls 24 and 20, respectively, are preferably also constructed from a suitable, durable, rigid, transparent, plastic sheet material in rectangular configurations. The front and rear walls 24 and 20, respectively, are hingeably connected to the first and second side walls 16 and 18, respectively, with hinges 32 and lock assemblies 34 are provided for securing the front and rear walls 24 and 20, respectively, in closed positions wherein they close the front and rear ends, respectively, of the cabinet 10. The lock assemblies 34 include lock pins 36 which are secured to the adjacent side walls, 16 or 18 and latch arms 38 which are moveable between positions of engagement and disengagement with their respective lock pins 36 for moving the lock assemblies 34 between locked and unlocked positions.

The inner cross wall 22 is preferably made from a suitable rigid sheet material, such as compressed fiberboard or the like, and it is secured in the interior of the cabinet 10 so that it is equally spaced from and substantially parallel to the front and rear walls 24 and 20, respectively, when the front and rear walls 24 and 20, respectively, are in the closed positions thereof. The shelf elements 26 are preferably each molded from a thin, substantially rigid, plastic sheet material so that they each define a plurality of vertically spaced shelves 40 on opposite sides of the inner cross wall 22. The shelves 40 are preferably downwardly inclined in their outward extents and they preferably include outer lips 42 for retaining packaged items thereon. The shelf elements 26 are preferably retained on opposite sides of the inner cross wall 22 by the corner elements 28 as will hereinafter be more fully set forth.

Figure 2:
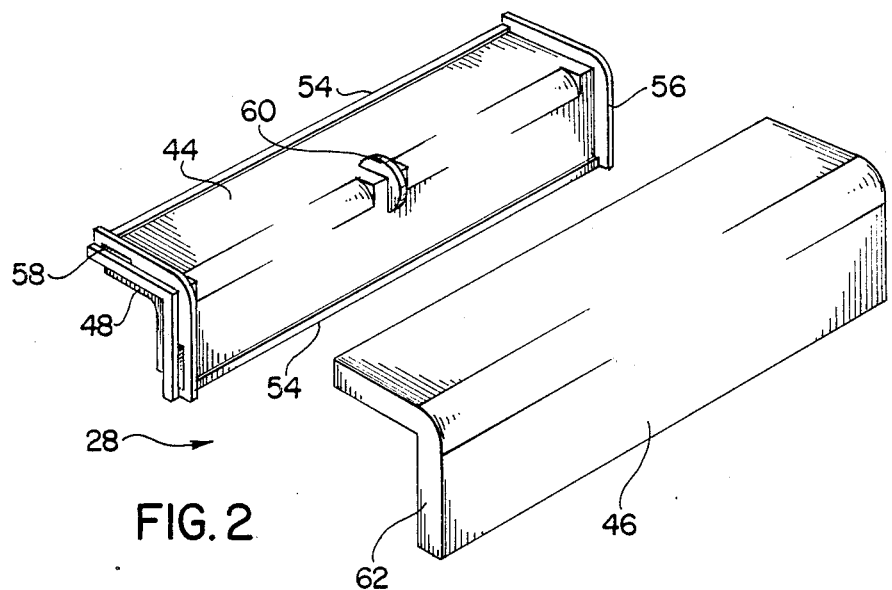
FIG. 2 is an exploded perspective view of one of the corner elements thereof.
Figure 3:
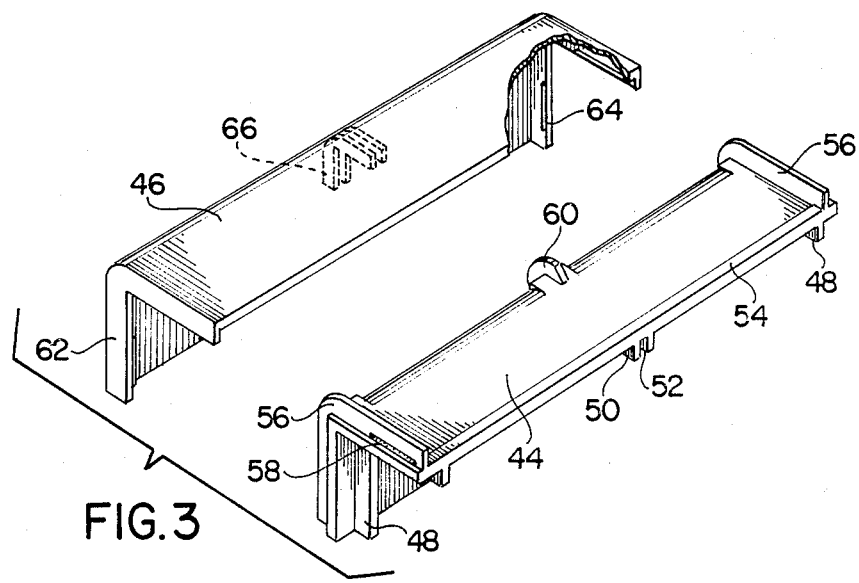
FIG. 3 is another exploded perspective view of one of the corner elements thereof.
Figure 4:
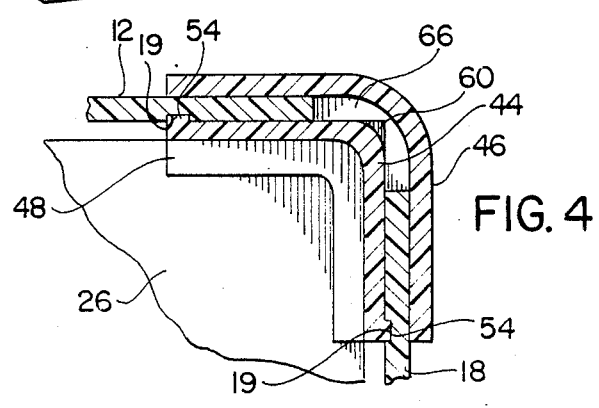
FIG. 4 is a sectional view taken along line 4—4 in FIG. 1.

Referring to FIGS. 2 through 4, one of the corner elements 28 is illustrated. As will be seen, each of the corner elements 28 includes an axially elongated right angle inner corner piece 44 and an axially elongated right angle outer corner piece 46. Each of the inner corner pieces 44 includes a pair of right angle positioning walls 48 which extend inwardly from the inner surface thereof adjacent opposite ends thereof and a channel element 50 which extends inwardly from the inner surface thereof in substantially equally spaced relation between the positioning walls 48 thereof to define an inwardly facing channel 52 on each inner corner piece 44. Formed along the outer side of each inner corner piece 44 adjacent the longitudinally extending edges thereof are elongated gripping rails 54 and reduced inner piece end walls 56 extend outwardly from the outer side of each inner corner piece 44 adjacent the opposite ends thereof. Slots 58 are formed in the outwardly facing sides of the inner corner piece end walls 56 as illustrated and a spacer disk 60 extends outwardly from the outer side of each inner corner piece 44. Each of the outer corner pieces 46 includes a pair of outer corner piece end walls 62 which extend inwardly adjacent opposite ends thereof. The outer corner piece end walls 62 have ridges 64 formed on the inner sides thereof and they are positioned so that the inner corner piece end walls 56 are receivable between the end walls 62 with the ridges 64 on the end walls 62 received in the slots 58 in the end walls 56. Accordingly, the end walls 56 and 62 cooperate to prevent relative longitudinal movement between the inner and outer corner pieces 44 and 46, respectively, and the ridges 64 and the slots 58 cooperate to retain the inner and outer corner pieces 44 and 46, respectively, in assembled relation. Each of the outer corner pieces 46 further includes an inwardly facing spacer channel element 66 which is dimensioned and positioned for receiving the spacer disk 60 of the inner corner piece thereof when the inner and outer corner pieces 44 and 46, respectively, of a corner element 28 are received in assembled relation.

Accordingly, for assembling the display cabinet 10, the side walls 16 and 18, respectively, and the top or bottom walls 12 and 14, respectively, are positioned in substantially perpendicular relation so that the end portions thereof are disposed between the inner and outer corner pieces 44 and 46, respectively, of the corner elements 28. The shelf elements 26 are positioned on opposite sides of the inner cross wall 22 and the inner cross wall 22 and the shelf elements 26 are positioned so that the corner portions thereof are received in the channels 52 on the inner sides of the inner corner pieces 44. The corner elements 28 are then assembled so that the spacer disks 60 on the inner corner pieces 44 thereof are received in the channel elements 66 on the outer corner pieces 46 thereof and so that the ridges 64 on the outer corner pieces 46 are snapped received in engagement in the slots 58 in the respective inner corner pieces 44 thereof to retain the inner and outer corner pieces 44 and 46, respectively, in engagement. When the inner and outer corner pieces 44 and 46, respectively, of the corner elements 28 are secured in engagement in this manner the gripping rails 54 on the inner corner pieces 44 are received in engagement in the grooves 19 in the top and bottom walls 12 and 14, respectively, and the side walls 16 and 18, respectively, as illustrated in FIG. 4 to firmly retain the top and bottom walls 12 and 14, respectively, and the side walls 16 and 18 in engagement in the corner elements 28.

It is seen, therefore, that the instant invention provides an effective and attractive display cabinet which is both rugged and durable and relatively economical to manufacture. The corner elements 28 are operative for firmly and rigidly securing the side walls 16 and 18 to the top and bottom walls 12 and 14, respectively, in order to form a relatively rigid rectangular structure. The corner elements 28 further provide a neat and attractive means for securing the side walls 16 and 18, respectively, and the top and bottom walls 12 and 14, respectively, together as well as for retaining the inner cross wall 22 and the shelf elements 26 in position. However, because the corner elements 28 are adapted to be readily and easily assembled with the adjacent portions of the side walls 16 and 18 and the top and bottom walls 12 and 14, respectively, the display cabinet 10 can be quickly and easily assembled with a minimum of labor costs. In addition, because of the overall rugged construction of the display cabinet 10 the front and rear walls 24 and 26 can be effectively locked in the closed position to enable the display cabinet 10 to be utilized for displaying relatively expensive jewelry items. Accordingly, it is seen that the display cabinet of the instant invention represents a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A display cabinet construction comprising:
   a. spaced, substantially parallel, top and bottom walls;
   b. spaced, substantially parallel first and second side walls extending substantially between said top and bottom walls in substantially perpendicular relation thereto;
   c. a cross wall extending substantially between said top and bottom walls in substantially perpendicular relation thereto; and
   d. four corner elements joining said top and bottom walls to said first and second side walls and operative for positioning said cross wall relative to said top and bottom walls and said first and second side walls, said corner elements each comprising a longitudinally elongated right angle inner piece and a longitudinally elongated right angle outer piece, said right angle inner pieces and said right angle outer pieces each having inner and outer sides and each comprising first and second substantially perpendicular disposed main walls, each of said corner elements further comprising retaining means snap receivable in interfitting engagement for retaining the inner and outer pieces thereof in a predetermined closely spaced, mating relation wherein the outer side of the inner piece thereof faces the inner side of the outer piece thereof and wherein the first and second main walls of the inner piece thereof are in closely spaced substantially parallel relation to the first and second main walls, respectively, of the outer piece thereof so that the main walls of the inner and outer pieces cooperate to define a pair of elongated, substantially perpendicularly disposed channels, one of said top or bottom walls and one of said first or second side walls being received in snug engagement in the channels of each corner element for joining the one of said top or bottom walls and the one of said first or second side walls received therein in substantially perpendicular relation, each of said corner elements further comprising positioning means on the inner side of the inner piece thereof for positioning said cross wall in substantially perpendicular relation to said top and bottom walls and said first and second side walls.

2. In the display cabinet of claim 1, said side walls being transparent.

3. In the display cabinet of claim 1, said cross wall further characterized as a rear wall, said positioning means being disposed adjacent the rear extremities of the respective corner elements thereof and being operative for positioning said rear wall adjacent the rear extremities of said top and bottom walls and said first and second side walls.

4. The cabinet of claim 3 further comprising an inner cross wall extending in substantially perpendicular relation between said top and bottom walls and said first and second side walls, said inner cross wall being spaced inwardly from said rear wall, each of said cover elements further comprising channel means defining an inwardly facing channel on the inner side of the inner piece thereof for receiving said inner cross wall and maintaining the latter in substantially perpendicular relation to said top and bottom walls and said first and second side walls.

5. The cabinet of claim 3 further comprising a front cross wall and hinge means hingeably connecting said front cross wall to one of said first or second side walls so that said front cross wall is movable between open and closed positions, each of said corner elements further comprising front wall positioning means on the inner side of the inner piece thereof for positioning said front cross wall in substantially perpendicular relation to said top and bottom walls and said first and second side walls when said front wall is in the closed position thereof.

6. The display cabinet of claim 4 further comprising shelf means on said inner cross wall for supporting items for display.

7. In the display cabinet of claim 1, each of said top and bottom walls having opposite side edges and each having a pair of elongated grooves formed therein which extend in substantially parallel inwardly spaced relation to the opposite side edges thereof, said side walls each having top and bottom edges and each having a pair of grooves formed therein which extend in substantially parallel, closely adjacent, inwardly spaced relation to the top and bottom edges thereof, said grooves having opposite first and second side faces, the first side faces of said grooves being closest to the respective closely adjacent side, top or bottom edges thereof and being substantially perpendicular to the respective side wall, top wall or bottom wall thereof, each of said corner elements including a pair of gripping rails on the corner pieces thereof, one of the gripping rails of each corner element being received in one of the grooves in the top or bottom wall received therein, the other gripping rail of each corner element being received in one of the grooves in the side wall received therein for retaining the side walls and the top and bottom walls in the corner pieces, the gripping rails of said corner elements including gripping faces which are substantially parallel to and received in mating engagement with the respective first side faces of the grooves in which the gripping nails are received.

8. A display cabinet construction comprising:
   a. spaced, substantially parallel, top and bottom walls;
   b. spaced, substantially parallel first and second side walls extending substantially between said top and bottom walls in substantially perpendicular relation thereto;
   c. a cross wall extending substantially between said top and bottom walls in substantially perpendicular relation thereto; and
   d. four corner elements joining said top and bottom walls to said first and second side walls and operative for positioning said cross wall relative to said top and bottom walls and said first and second side walls, said corner elements each comprising a longitudinally elongated right angle inner piece and a longitudinally elongated right angle outer piece, one of said top or bottom walls and one of said first or second side walls being received in snug engagement between the inner and outer pieces of each corner element for joining the one of said top or bottom walls and the one of said first or second side walls received therein in substantially perpendicular relation, each of said corner elements further comprising positioning means on the inner side of the inner piece thereof for positioning said cross wall in substantially perpendicular relation to said top and bottom walls and said first and second side walls, said corner elements further comprising, reduced outer piece and walls on the inner sides of the outer corner pieces thereof adjacent opposite ends thereof and reduced inner pieces end walls on the outer sides of the inner corner pieces thereof adjacent opposite ends thereof, the inner corner piece end walls and the outer corner piece end walls of each of said corner elements being received in interfitting relation for preventing relative longitudinal movement between the inner and outer corner pieces thereof.

9. In the cabinet construction of claim 8, each of said corner elements further comprising retaining means on the inner corner piece and outer corner piece end walls thereof for retaining the inner and outer corner pieces thereof in assembled relation.

* * * * *